(12) United States Patent
Speier et al.

(10) Patent No.: US 11,704,253 B2
(45) Date of Patent: Jul. 18, 2023

(54) PERFORMING SPECULATIVE ADDRESS TRANSLATION IN PROCESSOR-BASED DEVICES

(71) Applicant: Microsoft Technology Licensing, LLC, Redmond, WA (US)

(72) Inventors: Thomas Philip Speier, Wake Forest, NC (US); Jason S. Wohlgemuth, Seattle, WA (US); Artur Klauser, Seattle, WA (US); Gagan Gupta, Bellevue, WA (US); Cody D. Hartwig, Seattle, WA (US); Abolade Gbadegesin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 17/177,775

(22) Filed: Feb. 17, 2021

(65) Prior Publication Data
US 2022/0261355 A1 Aug. 18, 2022

(51) Int. Cl.
*G06F 9/38* (2018.01)
*G06F 12/1081* (2016.01)
(Continued)

(52) U.S. Cl.
CPC ........ *G06F 12/1036* (2013.01); *G06F 9/3004* (2013.01); *G06F 9/30079* (2013.01);
(Continued)

(58) Field of Classification Search
None
See application file for complete search history.

(56) References Cited

U.S. PATENT DOCUMENTS 4,084,226 A 4/1978 Anderson et al.
6,304,951 B1 * 10/2001 Mealey .............. G06F 12/1081
711/208
(Continued)

FOREIGN PATENT DOCUMENTS

WO    WO-2022133841 A1 *  6/2022

OTHER PUBLICATIONS

Patterson et al. Computer Organization and Design. 2014. Morgan Kaufmann. 5th ed. pp. 271-303.*
Gdaniec et al. "VM Data Spaces and ESA/XC facilities." 1991. IBM. IBM Systems Journal. vol. 30. pp. 14-33.*
"International Search Report and Written Opinion Issued in PCT Application No. PCT/US22/011884", dated Apr. 14, 2022, 10 Pages. (MS# 409221-WO-PCT).

*Primary Examiner* — Nathan Sadler
(74) *Attorney, Agent, or Firm* — Withrow & Terranova, PLLC (57) ABSTRACT

Performing speculative address translation in processor-based devices is disclosed herein. In one exemplary embodiment, a processor-based device provides a processing element (PE) that defines a speculative translation instruction such as an enqueue instruction for offloading operations to a peripheral device. The speculative translation instruction references a plurality of bytes including one or more virtual memory addresses. After receiving the speculative translation instruction, an instruction decode stage of an execution pipeline circuit of the PE transmits a request for address translation of the virtual memory address to a memory management unit (MMU) of the PE. The MMU then performs speculative address translation of the virtual memory address into a corresponding translated memory address. In some embodiments, any address translation errors encountered are raised to an appropriate exception level, and may be raised synchronously or asynchronously with respect to an operation performed when the speculative translation instruction is executed.

19 Claims, 6 Drawing Sheets

(51) Int. Cl.
*G06F 12/1036* (2016.01)
*G06F 9/30* (2018.01)
*G06F 9/455* (2018.01)
*G06F 11/07* (2006.01)
*G06F 12/0882* (2016.01)
*G06F 12/1045* (2016.01)

(52) U.S. Cl.
CPC ........ *G06F 9/30101* (2013.01); *G06F 9/3842* (2013.01); *G06F 9/45558* (2013.01); *G06F 11/0772* (2013.01); *G06F 12/0882* (2013.01); *G06F 12/1054* (2013.01); *G06F 12/1063* (2013.01); *G06F 12/1081* (2013.01); *G06F 2009/45583* (2013.01)

(56) References Cited

U.S. PATENT DOCUMENTS

| | | | |
|---|---|---|---|
| 8,738,860 B1 | 5/2014 | Griffin et al. | |
| 9,514,059 B2 | 12/2016 | Venkatasubramanian et al. | |
| 2006/0041735 A1* | 2/2006 | Hepkin | G06F 12/1081 711/E12.067 |
| 2008/0091915 A1* | 4/2008 | Moertl | G06F 12/1081 710/22 |
| 2016/0070630 A1* | 3/2016 | Williams | G06F 11/3648 714/33 |
| 2019/0095343 A1* | 3/2019 | Gopal | G06F 12/1027 |

* cited by examiner

PERFORMING SPECULATIVE ADDRESS TRANSLATION IN PROCESSOR-BASED DEVICES

FIELD OF THE DISCLOSURE

The technology of the disclosure relates to the use of virtual memory in processor-based devices, and, more particularly, to reducing page faults encountered by peripheral devices when accessing virtual memory.

BACKGROUND

Peripheral devices, such as hardware accelerator devices, are used conventionally to handle operations that may be offloaded by an application that is executing on a host processor-based device. When the application determines that a particular operation on a specific dataset should be offloaded to the peripheral device, the application packages all data relevant to the operation (e.g., data-buffer pointer for the dataset, the type of operation to be performed, and the like, as non-limiting examples) into a work item descriptor. The application then transmits the work item descriptor to the peripheral device using an enqueue instruction, and may continue performing other tasks while the peripheral device performs the requested operation. When the peripheral device completes the requested operation, the peripheral device transmits a completion notification back to the application to inform the application that the operation is complete, and to provide a result of the operation to the application.

As peripheral devices leverage technologies such as shared virtual memory (SVM), existing mechanisms for address translation and memory paging (e.g., using Peripheral Component interconnect Express (PCIe) Address Translation Services (ATS), Page Request interface (PRI), and Process Address Space Identifiers (PASIDs), as non-limiting examples) enable such peripheral devices to perform Direct Memory Access (DMA) operations to and from guest virtual addresses. However, it is possible for physical memory pages corresponding to the guest virtual addresses to be "paged out," or not resident in physical memory, at the time the DMA operations are made. This may result in address translation exceptions such as page faults being encountered by a peripheral device, causing negative impacts on latency and/or throughput for the operations that were offloaded to the peripheral device.

Some conventional approachs to minimizing page faults and associated page requests by peripheral devices involve offloading operations to a peripheral device only when a paging operation is expected to be rare, or offloading only operations that access virtual addresses which are known to have been very recently read or written (creating a high likelihood that the corresponding physical memory pages are resident in memory). These approaches, though, limit the number of scenarios in which offloading operations may be employed. Another conventional approach involves "pinning" memory pages to ensure that physical memory pages associated with the shared virtual memory addresses (along with the page tables that map such physical memory pages) are always resident. However, the pinning approach generally goes against the goals of efficiently offloading work to peripheral devices that seek to queue work directly from within user-mode applications without the need for expensive system calls or hypercalls.

Still another conventional approach involves "pre-touching" memory pages by performing otherwise unnecessary memory accesses to an address space associated with the offloaded work to ensure that the memory pages are resident before any page requests are performed by a peripheral device. While this approach may reduce the likelihood of page fault handling by the peripheral device, it is inconsistent with the programming model for offloading operations, may require more work by a processor device before or after the queuing of the offloaded operation, and may require care to avoid accidentally polluting caches. Moreover, because the pre-touching operations and the enqueue operation are not performed atomically, there may be no guarantee that a pre-touching operation will be executed temporally close to an enqueue operation.

Accordingly, a more efficient mechanism for reducing the occurrence of page faults associated with memory operations by peripheral devices is desirable.

SUMMARY

Exemplary embodiments disclosed herein provide speculative address translation in processor-based devices. In this regard, in one exemplary embodiment, a processor-based device provides a processing element (PE) that expands the functionality of a memory-pointer-referencing (MPR) instruction (e.g., an enqueue instruction for offloading operations to a peripheral device, as a non-limiting example) to also perform speculative address translation of a memory pointer referenced by the instruction. The PE includes an execution pipeline circuit that comprises an instruction decode stage configured to receive the MPR instruction, wherein the MPR instruction references a plurality of bytes (such as a 64-byte work descriptor, as a non-limiting example) that include one or more virtual memory addresses. After receiving the MPR instruction, the PE transmits a request for address translation of the virtual memory address to a memory management unit (MMU) of the PE. The MMU then performs speculative address translation of the virtual memory address into a corresponding translated memory address, and the PE executes the MPR instruction using an execute stage of the execution pipeline circuit. In some embodiments, if the MMU detects an address translation error while performing the speculative address translation (e.g., due to a physical memory page not being resident in memory), the MMU may raise an address translation exception (e.g., a page fault, as a non-limiting example) to an appropriate exception level. For instance, the address translation exception may be raised to a guest operating system (OS) if the address translation error occurs while translating a guest virtual address to a guest physical address, or may be raised to a hypervisor if the address translation error occurs while translating a guest physical address to a system physical address.

In another exemplary embodiment, a processor-based device includes a PE that comprises an execution pipeline circuit comprising an instruction decode stage and an execute stage and an MMU. The PE is configured to receive, using the instruction decode stage, an MPR instruction that references a plurality of bytes that comprises a virtual memory address. The PE is further configured to transmit, to the MMU, a request for address translation of the virtual memory address. The PE is also configured to perform, using the MMU, speculative address translation of the virtual memory address into a corresponding translated memory address. The PE is additionally configured to execute, using the execute stage of the execution pipeline circuit, the MPR instruction.

In another exemplary embodiment, a method for performing speculative address translation in processor-based devices is provided. The method comprises receiving, using an instruction decode stage of art execution pipeline circuit of a PE of a processor-based device, an MPR instruction that references a plurality of bytes that comprises a virtual memory address. The method further comprises transmitting, to an MMU of the PE, a request for address translation of the virtual memory address. The method also comprises performing, by the MMU, speculative address translation of the virtual memory address into a corresponding translated memory address. The method additionally comprises executing, using an execute stage of the execution pipeline circuit, the MPR instruction.

In another exemplary embodiment, a non-transitory computer-readable medium is provided, the computer-readable medium having stored thereon computer-executable instructions which, when executed by a processor-based device, cause the processor-based device to receive an MPR instruction that references a plurality of bytes that comprises a virtual memory address. The computer-executable instructions further cause the processor-based device to transmit, to an MMU of the processor-based device, a request for address translation of the virtual memory address. The computer-executable instructions also cause the processor-based device to perform speculative address translation of the virtual memory address into a corresponding translated memory address. The computer-executable instructions additionally cause the processor-based device to execute the MPR instruction.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Exemplary embodiments disclosed herein provide speculative address translation in processor-based devices. In this regard, in one exemplary embodiment, a processor-based device provides a processing element (PE) that expands the functionality of a memory-pointer-referencing (MPR) instruction (e.g., an enqueue instruction for offloading operations to a peripheral device, as a non-limiting example) to also perform speculative address translation of a memory pointer referenced by the instruction. The PE includes an execution pipeline circuit that comprises an instruction decode stage configured to receive the MPR instruction, wherein the MPR instruction references a plurality of bytes (such as a 64-byte work descriptor, as a non-limiting example) that include one or more virtual memory addresses. After receiving the MPR instruction, the PE transmits a request for address translation of the virtual memory address to a memory management unit (MMU) of the PE. The MMU then performs speculative address translation of the virtual memory address into a corresponding translated memory address, and the PE executes the MPR instruction using an execute stage of the execution pipeline circuit. In some embodiments, if the MMU detects an address translation error while performing the speculative address translation (e.g., due to a physical memory page not being resident in memory), the MMU may raise an address translation exception (e.g., a page fault, as a non-limiting example) to an appropriate exception level. For instance, the address translation exception may be raised to a guest operating system (OS) if the address translation error occurs while translating a guest virtual address to a guest physical address, or may be raised to a hypervisor if the address translation error occurs while translating a guest physical address to a system physical address.

Figure 1:
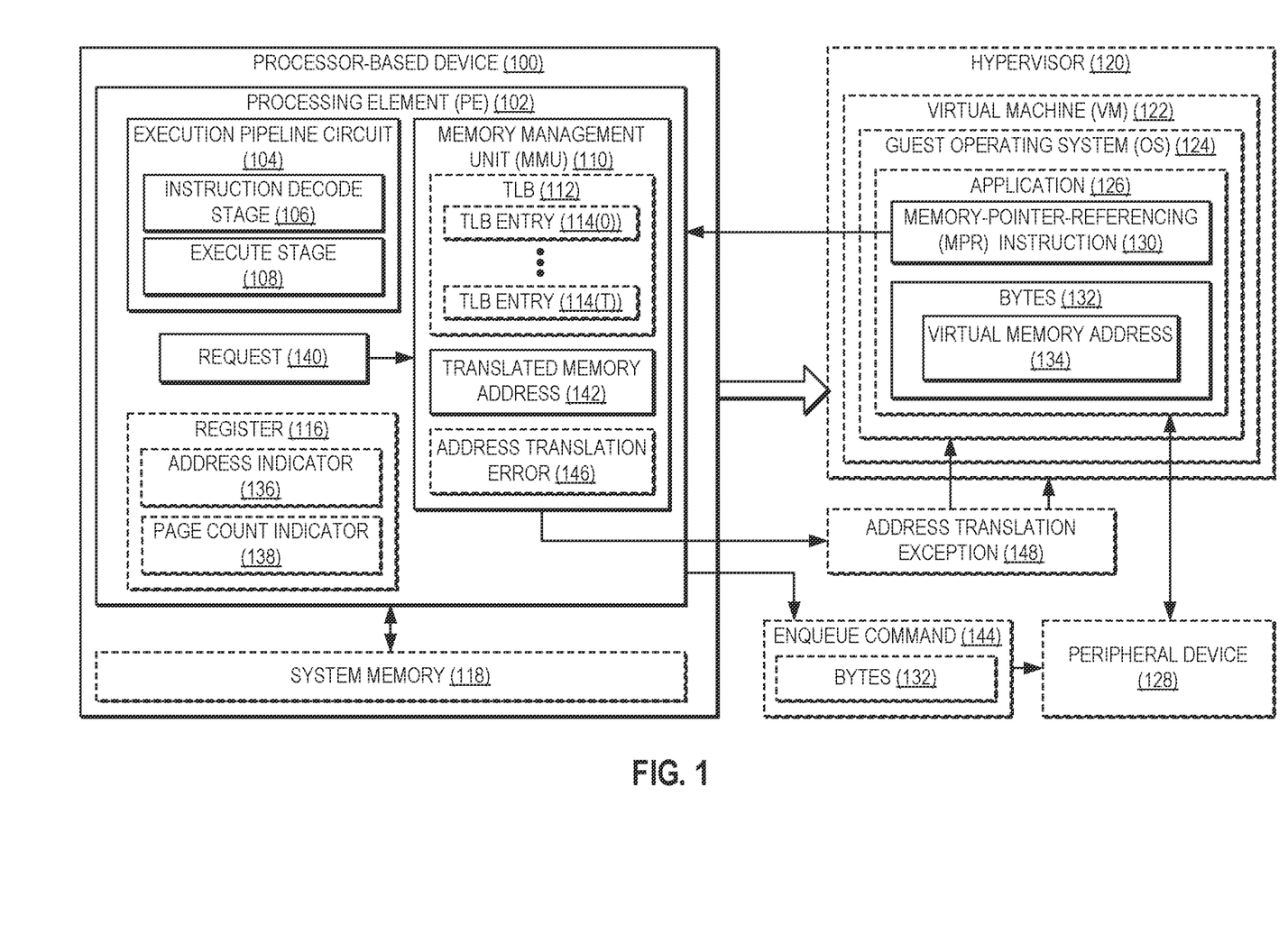
FIG. 1 is a schematic diagram of an exemplary processor-based device that includes a processing element (PE) configured to provide speculative address translation.

In this regard, FIG. 1 illustrates an exemplary processor-based device 100 that provides a PE 102 for processing executable instructions. The PE 102 may comprise an individual processor core, including a logical execution unit and associated caches and functional units, of a central processing unit (CPU). The PE 102 of FIG. 1 includes an execution pipeline circuit 104 that is configured to execute an instruction stream comprising computer-executable instructions. The execution pipeline circuit 104 includes an instruction decode stage 106 for translating fetched instructions into control signals for instruction execution, and an execute stage 108 for actually performing instruction execution. Although not shown in FIG. 1, the execution pipeline circuit 104 in some embodiments may include additional elements, such as a fetch stage for retrieving instructions for execution, a rename stage for allocating physical register file (PRF) registers from a PRF (not shown), a dispatch stage for issuing instructions for execution, and/or a commit stage for irrevocably updating the architectural state of the PE 102 based on the results of instruction execution. It is to be understood that some embodiments of the processor-based device 100 may comprise multiple PEs 102 rather than the single PE 102 shown in the example of FIG. 1, and further that some embodiments of the PE 102 may include fewer or more stages within the execution pipeline circuit 104 than those illustrated in the example of FIG. 1.

The PE 102 of FIG. 1 further comprises an MMU 110, which provides virtual memory functionality by performing address translation of virtual memory addresses to physical memory addresses. Some embodiments of the MMU 110 include a translation lookaside buffer (TLB) 112, which provides TLB entries 114(0)-114(T) for caching recent translations of virtual memory addresses to physical memory addresses for subsequent reuse. The PE 102 in some embodiments also comprises a register 116. The register 116 may comprise, for example, a general purpose register (GPR) or a system register (SR), as non-limiting examples, and may be one of a plurality of registers (not shown). The PE 102 according to some embodiments is communicatively coupled to a system memory 118 of the processor-based device 100. The system memory 118 may comprise, e.g., dynamic random access memory (DRAM), such as synchronous DRAM (SDRAM), or static random access memory (SRAM), as non-limiting examples.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the PE 102 may further include one or more instruction caches, unified caches, memory controllers, interconnect buses, and/or additional memory devices, caches, and/or controller circuits.

In the example of FIG. 1, the PE 102 is executing a hypervisor 120 for providing Virtuallzation functionality. Executing within the hypervisor 120 is a virtual machine (VM) 122, within which a guest OS 124 is executing. The guest OS 124, in turn, is executing an application 126 (i.e., a software application comprising computer-executable instructions that are executable by the PE 102). The application 126 of FIG. 1 is communicatively coupled to a peripheral device 128 via an interface (not shown), such as an interface supporting the Peripheral Component Interconnect Express (PCIe) standard. The peripheral device 128 may comprise, e.g., a hardware accelerator device.

In the course of execution, the application 126 may identify a processing task or operation that may be performed more efficiently or quickly by the peripheral device 128. The application 126 thus may elect to offload the processing task to the peripheral device 128 by packaging data relevant to the operation into a work item descriptor, and executing an enqueue instruction to transmit the work item descriptor to the peripheral device 128. While performing the offloaded operation, the peripheral device 128 may perform Direct Memory Access (DMA) operations to and from guest virtual addresses allocated by the guest OS 124 for use by the application 126. However, it is possible for physical memory pages corresponding to the guest virtual addresses to be "paged out," or not resident in the guest physical memory managed by the guest OS 124 or the system physical memory managed by the hypervisor 120, at the time the DMA operations are performed. This may result in address translation exceptions such as page faults being encountered by the peripheral device 128, causing negative impacts on latency and/or throughput of the operations offloaded to the peripheral device 128.

It is to be understood that page faults encountered by the peripheral device 128 are inherently more expensive, in terms of latency and throughput effects, than page faults handled by the PE 102. The additional latency incurred by the peripheral device 128 in handling a page fault is in addition to the latency associated with the peripheral device 128 beginning the offloaded work via an Address Translation Service (ATS) operation. If the ATS operation fails, the peripheral device 128 must perform, at a minimum, a Page Request Interface (PRI) operation followed by another ATS operation, and may also be required to perform context switching on the peripheral device 128 itself. Additionally, page requests performed by the peripheral device 128 must funnel through a single queue in an MMU responsible for translating memory addresses originating from the peripheral device 128 (e.g, an input/output memory management unit (IOMMU) or a system memory management unit (SMMU)), which may require the hypervisor 120 to demultiplex the page requests in per-VM queues (not shown). Each VM, such as the VM 122, would then need to further dequeue and parellelize the page requests for efficient processing.

In this regard, the PE 102 is configured to provide speculative address translation. In an exemplary embodiment, the PE 102 is configured to support art MPR instruction 130 that may be incorporated into applications such as the application 126. The MPR instruction 130 may be implemented within the PE 102 as a dedicated instruction with a unique opcode provided by an instruction set architecture (ISA) of the PE 102. Alternatively or additionally, the MPR instruction 130 may be a conventional instruction to which additional operands and/or opcode bits are added to accomplish the functionality described herein. The MPR instruction 130 may comprise any instruction that references one or more memory pointers for which speculative address translation is to be performed in addition to the functionality of the MPR instruction. Thus, as a non-limiting example, the MPR instruction 130 in some embodiments may comprise an enqueue instruction directed to the peripheral device 128 to enqueue a work descriptor.

The MPR instruction 130 in FIG. 1 references a plurality of bytes 132 that includes a virtual memory address 134 (e.g., a virtual memory address to which the peripheral device 128 may perform a DMA operation in the future). The MPR instruction 130 may reference the plurality of bytes 132 by, for example, accessing the plurality of bytes 132 at a fixed location in memory, or by receiving, as a parameter, a memory address at which the plurality of bytes 132 may be accessed or an identifier of one or more registers that store the plurality of bytes 132. The plurality of bytes 132 may comprise, as a non-limiting example, a 64-byte work descriptor to be enqueued to the peripheral device 128. It is to be understood that, while FIG. 1 shows only one virtual memory address 134, the plurality of bytes 132 in some embodiments may contain multiple memory addresses.

In some embodiments, the PE 102 is configured to provide a mechanism associated with the MPR instruction 130 to indicate where among the plurality of bytes 132 the virtual memory address 134 is located. For example, some embodiments may provide that the MPR instruction 130 always accesses a fixed location within the plurality of bytes 132 to retrieve the virtual memory address 134, while in some embodiments a location of the virtual memory address 134 within the plurality of bytes may be indicated by an address indicator (not shown) provided as part of an opcode of the MPR instruction 130. According to some embodiments, the MPR instruction 130 may reference an address indicator (not shown) that indicates a location of the virtual memory address 134 within the plurality of bytes 132. For instance, each bit of eight (8) bits of a byte of the plurality of bytes 132 of the MPR instruction 130 may be used as an address indicator to indicate which 64-bit values stored within the plurality of bytes 132 correspond to virtual memory addresses. Upon execution of the MPR instruction 130, the virtual memory address 134 is retrieved from the plurality of bytes 132 based on the address indicator.

Some embodiments may provide that an address indicator, such as the address indicator 136, may be stored in a register such as the register 116. The register 116 may be identified by a register identifier (not shown) provided as part of the MPR instruction 130 (e.g., within the plurality of bytes 132, or as a parameter of the MPR instruction 130, as non-limiting examples). Before executing the MPR instruction 130, the PE 102 may be configured to store the address indicator 136 in the register 116, and when the MPR instruction 130 is subsequently executed, the address indicator 136 may be read from the register 116 based on the register identifier. The virtual memory address 134 may then be retrieved from the plurality of bytes 132 based on the address indicator 136.

Additionally, some embodiments may employ the register 116 to store additional parameter data that may be useful for speculative address translation. For instance, the PE 102 in some embodiments may also store in the register 116 a page count indicator 138 that indicates a count of memory pages that may require address translation for the virtual memory address 134. The page count indicator 138 in some embodiments may be stored as part of the plurality of bytes 132, or as part of the opcode of the MPR instruction 130.

During execution of the application 126, the instruction decode stage 106 of the execution pipeline circuit 104 of the PE 102 receives the MPR instruction 130 referencing the plurality of bytes 132 including the virtual memory address 134. The PE 102 is configured to transmit a request 140 for address translation of the virtual memory address 134 to the MMU 110 of the PE 102. The MMU 110 then performs speculative address translation of the virtual memory address 134 into a corresponding translated memory address 142 (e.g., a guest physical address or a system physical address, as non-limiting examples). The operations performed by the MMU 110 for performing the speculative address translation may correspond to conventional operations performed in the course of translating a virtual memory address into a physical memory address, such as performing page table walks, updating translation tables (not shown) to include the results of the speculative address translation, and/or caching the results of the speculative address translation in the TLB 112.

In some embodiments, the MPR instruction 130 may reference a TLB indicator (not shown) that indicates whether a TLB entry of the plurality of TLB entries 114(0)-114(T) is allocated for the speculative address translation of the virtual memory address 134 into the translated memory address 142. If the TLB indicator is set (i.e., indicates a value of true), the TLB 112 is updated by the MMU 110 in conventional fashion as part of performing the speculative address translation. Conversely, if the TLB indicator is not set, the MMU 110 may not update the TLB 112 to avoid polluting the TLB 112 with the results of the speculative address translation. Some embodiments may provide that, if the TLB indicator is not set, the MMU 110 may update the TLB 112, but may assign a weight to the allocated TLB entry of the plurality of TLB entries 114(0)-114(T) to indicate that the allocated TLB entry is to be evicted before other TLB entries of the plurality of TLB entries 114(0)-114(T). The MPR instruction 130 may reference the TLB indicator by, for example, receiving a parameter specifying a location of the TLB indicator in memory, in a register, or within the plurality of bytes 132, or by accessing the TLB indicator stored at a fixed location in memory, in a register, or within the plurality of bytes 132.

As noted above, the MPR instruction 130 according to some embodiments may comprise an enqueue instruction directed to the peripheral device 128. Accordingly, in such embodiments, the PE 102 is configured to execute the MPR instruction 130 using the execute stage 108 of the execution pipeline circuit 104, which results in an enqueue command 144 referencing the plurality of bytes 132 being transmitted to the peripheral device 128.

In some embodiments, the MMU 110 may detect an address translation error 146 while performing the speculative address translation of the virtual memory address 134. The address translation error 146 may indicate, for example, that a memory page corresponding to the translated memory address 142 is not resident in memory. In response, the MMU 110 of the PE 102 may raise an address translation exception 148 (e.g., a page fault exception, as a non-limiting example).

Some embodiments may provide that the MMU 110 raises the address translation exception 148 to an appropriate exception level depending on a stage of address translation at which the address translation error 146 occurs. For instance, the address translation error 146 may occur as the MMU 110 performs a speculative address translation of a guest virtual address into a guest physical address of the guest OS 124 (i.e., a stage one (1) translation error). This may occur, for example, if the virtual memory address 134 is a guest virtual address of the guest OS 124. Accordingly, the MMU 110 may raise the address translation exception 148 to the guest OS 124 for handling. In some embodiments, the address translation error 146 may occur as the MMU 110 performs the speculative address translation of a guest physical address into a system physical address of the PE 102 (i.e., a stage two (2) translation error). For instance, the virtual memory address 134 may comprise a guest physical address of the guest OS 124, or may comprise a guest virtual address of the guest OS 124 that requires two stages of translation. In response to a stage two (2) translation error, the MMU 110 may raise the address translation exception 148 to the hypervisor 120 for handling. Some embodiments may provide that the MMU 110 raises the address translation exception 148 to the hypervisor 120 for handling regardless of whether the address translation exception 148 occurs as a result of a stage one (1) translation error or a stage two (2) translation error.

In embodiments in which the MPR instruction 130 is used to carry out an operation such as enqueuing the plurality of bytes 132 to the peripheral device 128, the MPR instruction 130 may reference a synchronicity indicator (not shown) to indicate whether any address translation errors, such as the address translation error 146, are reported synchronously or asynchronously with respect to the operation. The MPR instruction 130 may reference the synchronicity indicator by, for example, receiving a parameter specifying a location of the synchronicity indicator in memory, in a register, or within the plurality of bytes 132, or by accessing the synchronicity indicator stored at a fixed location in memory, in a register, or within the plurality of bytes 132.

Thus, in the example where the MPR instruction 130 is an enqueue instruction directed to the peripheral device 128, the address translation error 146 may be reported synchronously prior to transmitting the enqueue command 144 to the peripheral device 128 if the synchronicity indicator is set (e.g., has a value of true). The address translation error 146 may be reported using conventional architectural mechanisms for reporting synchronous translation errors, and may be reported one address translation error at a time or all at once. Conversely, the reporting of the address translation error 146 may be performed asynchronously in parallel with transmitting the enqueue command 144 to the peripheral device 128 if the synchronicity indicator is not set. The address translation error 146 may be recorded, e.g., in a syndrome register (not shown) for servicing by software. Note that, if asynchronous reporting is performed, a race condition may result between the reporting and subsequent handling of the address translation error 146 and the enqueue command 144 reaching the peripheral device 128. This may result in the address translation error 146 not being serviced by the time the peripheral device 128 attempts to access a memory page corresponding to the virtual memory address 134. In this case, the peripheral device 128 may need to perform a PRI operation in conventional fashion.

Figure 2:
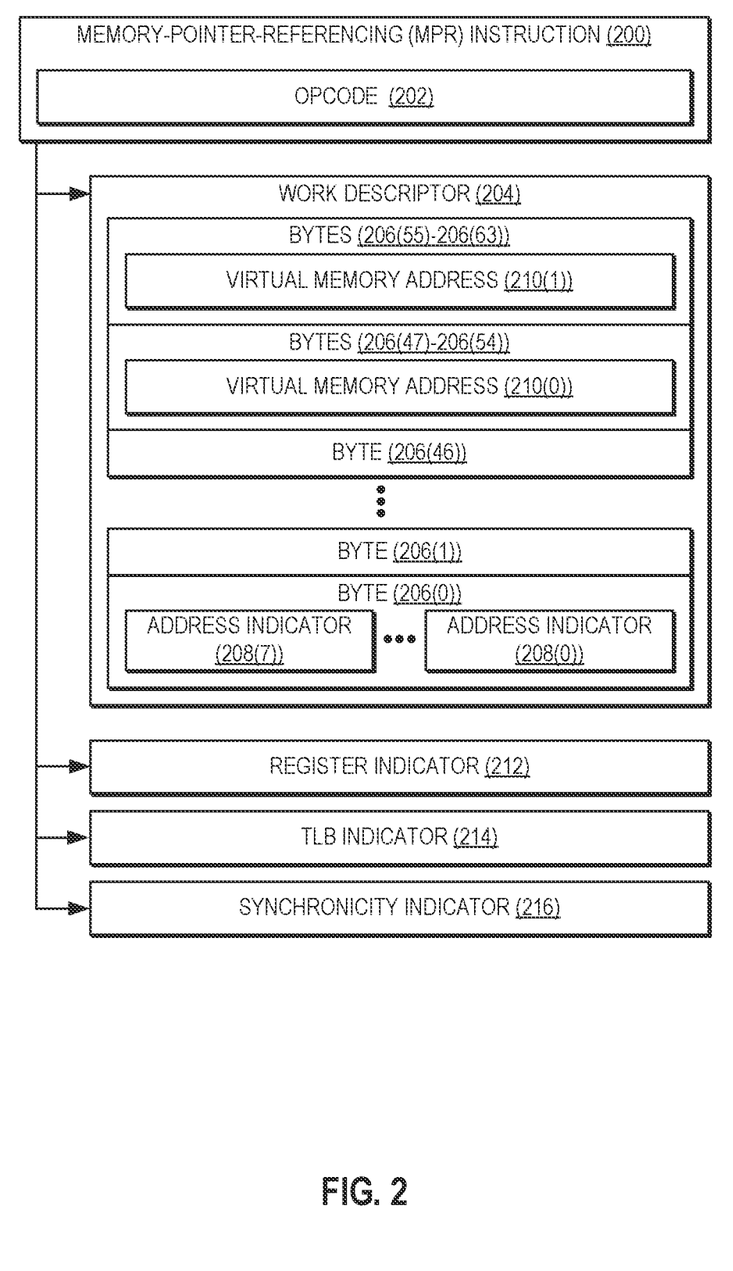
FIG. 2 is a block diagram illustrating exemplary contents of a memory-pointer-referencing (MPR) instruction such as the MPR instruction of FIG. 1.

To provide a more detailed description of exemplary contents of a MPR instruction such as the MPR instruction 130 of FIG. 1, FIG. 2 is provided. In FIG. 2, an MPR instruction 200, corresponding in functionality to the MPR instruction 130 of FIG. 1, is shown. The MPR instruction 200 comprises an opcode 202 that indicates an operation to be performed by the PE 102 of FIG. 1 when the MPR instruction 200 is executed. The MPR instruction 200 references a 64-byte work descriptor 204, which in the example of FIG. 2 comprises a plurality of bytes 206(0)-206(63) corresponding to the plurality of bytes 132 of FIG. 1. The work descriptor 204 stores data relevant to an operation to be offloaded to a peripheral device such as the peripheral device 128 of FIG. 1. The MPR instruction 200 may reference the work descriptor 204 by, for example, taking as a parameter a memory address at which the work descriptor 204 may be accessed, or an identifier of one or more registers that store the work descriptor 204.

In the example of FIG. 2, the first byte 206(0) of the plurality of bytes 206(0)-206(63) comprises a plurality of address indicators 208(0)-208(7) that may be used to indicate which of the plurality of bytes 206(0)-206(63) correspond to virtual memory addresses for which speculative address translation is to be performed. Each of the address indicators 208(0)-208(7) comprises a bit of the byte 206(0), and corresponds to a group of eight (8) bytes within the bytes 206(0)-206(63) that may store a 64-bit virtual address. In FIG. 2, the bytes 206(47)-206(54) are used to store a virtual memory address 210(0), while the bytes 206(55)-206(63) are used to store a virtual memory address 210(1). Accordingly, the address indicators 208(6) and 208(7) may be set to indicate the locations of the virtual memory addresses 210(0) and 210(1) within the plurality of bytes 206(0)-206(63).

The MPR instruction 200 of FIG. 2 further references additional indicators, including a register indicator 212, a TLB indicator 214, and a synchronicity indicator 216, the functionality of each of which is discussed in greater detail above with respect to FIG. 1. In some embodiments, the register indicator 212, the TLB indicator 214, and/or the synchronicity indicator 216 may comprise parameters that are specified as part of the MPR instruction 200. Some embodiments may provide that the register indicator 212, the TLB indicator 214, and/or the synchronicity indicator 216 may be provided as part of a byte of the plurality of bytes 206(0)-206(63), while in some embodiments the TLB indicator 214 and/or the synchronicity indicator 216 may be stored at a specified memory location or in a register indicated by the register indicator 212.

Figure 3A:
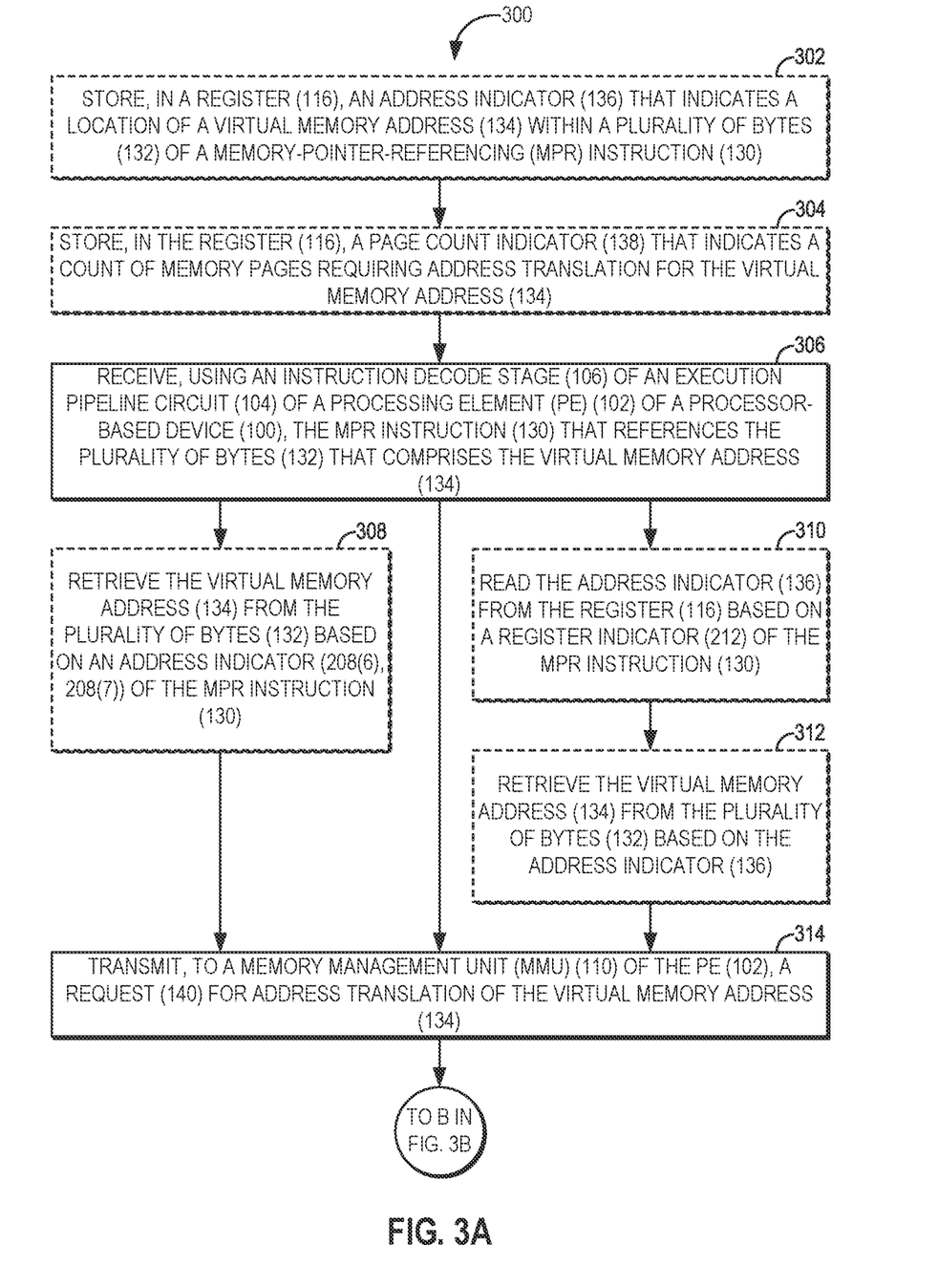
FIGS. 3A-3C are flowcharts illustrating exemplary operations for performing speculative address translation.
Figure 3B:
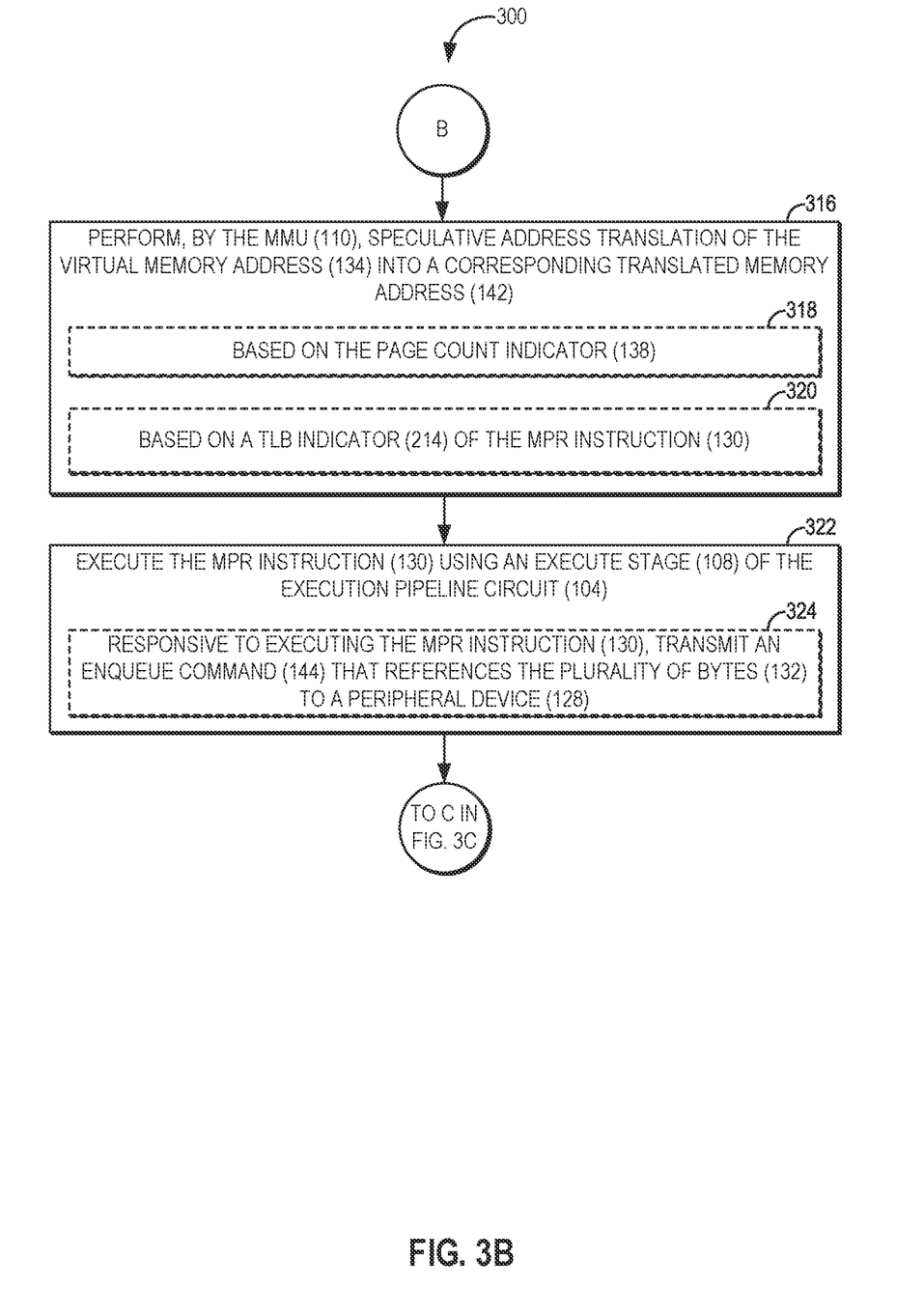
Figure 3C:
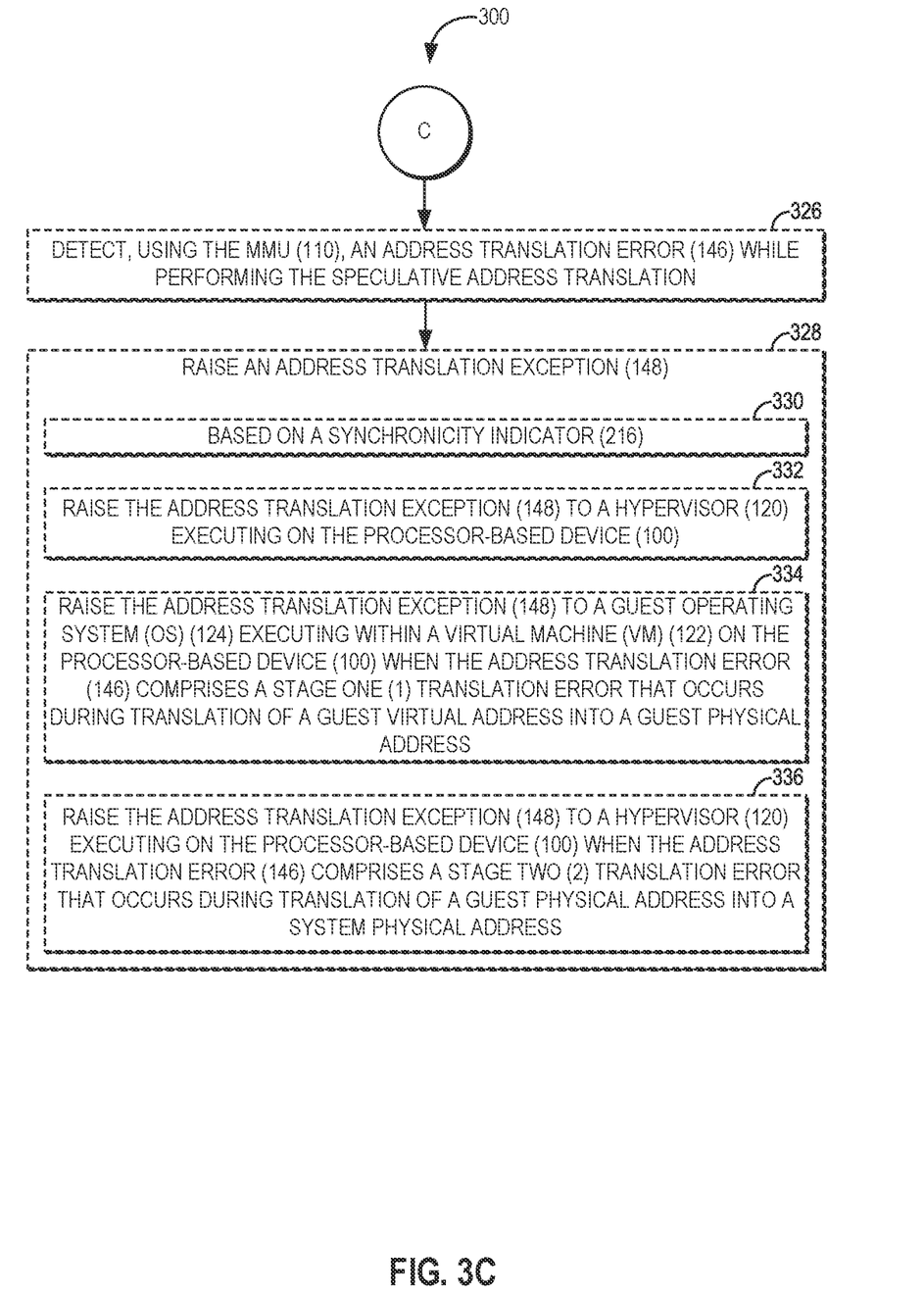

FIGS. 3A-3C provide a flowchart 300 illustrating exemplary operations for performing speculative address translation by the PE 102 of FIG. 1. For the sake of clarity, elements of FIGS. 1 and 2 are referenced in describing FIGS. 3A-3C. It is to be understood that some operations illustrated in FIGS. 3A-3C may occur in an order other than that illustrated in FIGS. 3A-3C in some embodiments, and/or may be omitted in some embodiments. In FIG. 3A, operations according to some embodiments begin with the PE 102 storing, in the register 116, the address indicator 136 that indicates a location of the virtual memory address 134 within the plurality of bytes 132 of the MPR instruction 130 (block 302). In some embodiments, the PE 102 may also store, in the register 116, the page count indicator 138 that indicates a count of memory pages requiring address translation for the virtual memory address 134 (block 304).

The PE 102 receives, using the instruction decode stage 106 of the execution pipeline circuit 104 of the PE 102 of the processor-based device 100, the MPR instruction 130 that references the plurality of bytes 132 that comprises the virtual memory address 134 (block 306). In embodiments in which the plurality of bytes 132 provide an address indicator (such as the address indicators 208(6) and 208(7) of FIG. 2), the PE 102 may retrieve the virtual memory address 134 from the plurality of bytes 132 based on the address indicator of the MPR instruction 130 (block 308). In embodiments in which the address indicator 136 is stored in the register 116, the PE 102 may read the address indicator 136 from the register 116 based on the register indicator 212 of the MPR instruction 130 (block 310). The PE 102 may then retrieve the virtual memory address 134 from the plurality of bytes 132 based on the address indicator 136 (block 312). The PE 102 then transmits, to the MMU 110 of the PE 102, the request 140 for address translation of the virtual memory address 134 (block 314). Operations then continue at block 316 of FIG. 3B.

Referring now to FIG. 3B, the PE 102 (i.e., using the MMU 110) performs speculative address translation of the virtual memory address 134 into the corresponding translated memory address 142 (block 316). In some embodiments, the operations of block 316 for performing the speculative address translation may be based on the page count indicator 138 (e.g., by performing address translation for the indicated number of memory pages) (block 318). Some embodiments may provide that the operations of block 316 for performing the speculative address translation may be based on the TLB indicator 214 of the MPR instruction 130 (block 320). Thus, for instance, the MMU 110 may allocate a TLB entry of the plurality of TLB entries 114(0)-114(T) of the TLB 112 if the TLB indicator 214 is set, and may not allocate a TLB entry (or may allocate a TLB entry and assign a lower weight) if the TLB indicator 214 is not set.

The PE 102 then executes the MPR instruction 130 using the execute stage 108 of the execution pipeline circuit 104 (block 322). In embodiments in which the MPR instruction 130 comprises an enqueue instruction, the operations of block 322 for executing the MPR instruction 130 may comprise, responsive to executing the MPR instruction 130, transmitting the enqueue command 144 that references the plurality of bytes 132 to the peripheral device 128 (block 324). Operations then continue at block 326 of FIG. 3C.

Turning now to FIG. 3C, some embodiments may provide that the PE 102 detects, using the MMU 110, the address translation error 146 while performing the speculative address translation (block 326). The PE 102 thus raises the address translation exception 148 (block 328). In some embodiments, the operations of block 328 for raising the address translation exception 148 are based on the synchronicity indicator 216 (block 330). Thus, for instance, if the MPR instruction 130 comprises an enqueue instruction and the synchronicity indicator 216 indicates that the address translation exception 148 is to be raised synchronously, the PE 102 may stall the enqueue instruction until the address translation exception 148 is reported using existing architectural mechanisms for reporting synchronous translation errors (e.g., mechanisms used for a load instruction). Conversely, if the synchronicity indicator 216 indicates that the address translation exception 148 is to be raised asynchronously, the PE 102 may complete execution of the enqueue instruction in parallel with raising the address translation exception 148.

Some embodiments may provide that the operations of block 328 for raising the address translation exception 148 may include raising the address translation exception 148 to the hypervisor 120 executing on the processor-based device 100 (i.e., regardless of whether the address translation exception 148 is raised in the course of translating a guest virtual address to a guest physical address, or translating a guest physical address to a system physical address) (block 332). In embodiments in which the address translation error 146 comprises a stage one (1) translation error that occurs during translation of a guest virtual address to a guest physical address, the operations of block 328 for raising the address translation exception 148 may comprise the PE 102 raising the address translation exception 148 to the guest OS 124 executing within the VM 122 on the processor-based device 100 (block 334). According to embodiments in which the address translation error 146 comprises a stage two (2) translation error that occurs during translation of a guest physical address to a system physical address, the operations of block 328 for raising the address translation exception 148 may comprise the PE 102 raising the address translation exception 148 to the hypervisor 120 on the processor-based device 100 (block 336).

Figure 4:
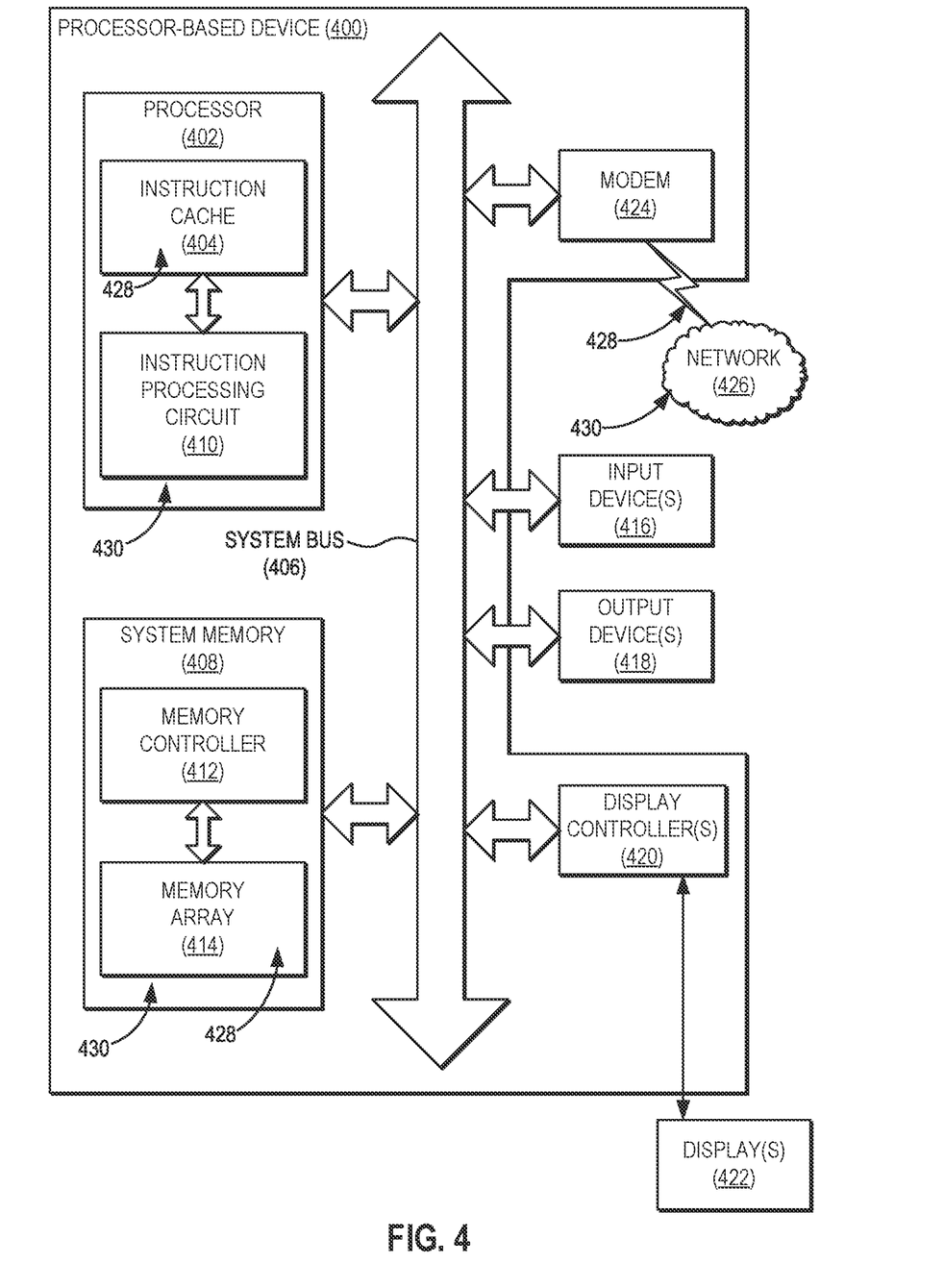
FIG. 4 is a block diagram of an exemplary processor-based device, such as the processor-based device of FIG. 1, that is configured to provide speculative address translation.

FIG. 4 is a block diagram of an exemplary processor-based device 400, such as the processor-based device 100 of FIG. 1, that provides speculative address translation. The processor-based device 400 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 400 includes a processor 402. The processor 402 represents one or more general-purpose processing circuits, such as a microprocessor, central processing unit, or the like, and may correspond to the PE 102 of FIG. 1. The processor 402 is configured to execute processing logic in instructions for performing the operations and steps discussed herein. In this example, the processor 402 includes an instruction cache 404 for temporary, fast access memory storage of instructions and an instruction processing circuit 410. Fetched or prefetched instructions from a memory, such as from a system memory 408 over a system bus 406, are stored in the instruction cache 404. The instruction processing circuit 410 is configured to process instructions fetched into the instruction cache 404 and process the instructions for execution.

The processor 402 and the system memory 408 are coupled to the system bus 406 and can intercouple peripheral devices included in the processor-based device 400. As is well known, the processor 402 communicates with these other devices by exchanging address, control, and data information over the system bus 406. For example, the processor 402 can communicate bus transaction requests to a memory controller 412 in the system memory 408 as an example of a peripheral device. Although not illustrated in FIG. 4, multiple system buses 406 could be provided, wherein each system bus constitutes a different fabric. In this example, the memory controller 412 is configured to provide memory access requests to a memory array 414 in the system memory 408. The memory array 414 is comprised of an array of storage bit cells for storing data. The system memory 408 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 406. As illustrated in FIG. 4, these devices can include the system memory 408, one or more input devices 416, one or more output devices 418, a modem 424, and one or more display controllers 420, as examples. The input device(s) 416 can include any type of input device, including, but not limited to, input keys, switches, voice processors, etc. The output device(s) 418 can include any type of output device, including, but not limited to, audio, video, other visual indicators, etc. The modem 424 can be any device configured to allow exchange of data to and from a network 426. The network 426 can be any type of network, including, but not limited to, a wired or wireless network, a private or public network, a local area network (LAN), a wireless local area network (WLAN), a wide area network (WAN), a BLUETOOTH™ network, and the Internet. The modem 424 can be configured to support any type of communications protocol desired. The processor 402 may also be configured to access the display controller(s) 420 over the system bus 406 to control information sent to one or more displays 422. The display(s) 422 can include any type of display, including, but not limited to, a cathode ray tube (CRT), a liquid crystal display (LCD), a plasma display, etc.

The processor-based device 400 in FIG. 4 may include a set of instructions 428 to be executed by the processor 402 for any application desired according to the instructions. The instructions 428 may be stored in the system memory 408, processor 402, and/or instruction cache 404 as examples of non-transitory computer-readable medium 430. The instructions 428 may also reside, completely or at least partially, within the system memory 408 and/or within the processor 402 during their execution. The instructions 428 may further be transmitted or received over the network 426 via the modem 424, such that the network 426 includes the computer-readable medium 430.

While the computer-readable medium 430 is shown in an exemplary embodiment to be a single medium, the term "computer-readable medium" should be taken to include a single medium or multiple media (e.g., a centralized or distributed database, and/or associated caches and servers) that store the one or more sets of instructions 428. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the processor-based devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A non-transitory computer-readable medium, having stored thereon computer-executable instructions that, when executed by a processor-based device, cause the processor-based device to:
   receive a memory-pointer-referencing (MPR) instruction that references a plurality of bytes that comprises a virtual memory address, wherein:
   the MPR instruction comprises an enqueue instruction directed to a peripheral device; and
   the virtual memory address comprises a virtual memory address to which the peripheral device will perform a Direct Memory Access (DMA) operation;

transmit, to a memory management unit (MMU) of the processor-based device, a request for address translation of the virtual memory address;
perform speculative address translation of the virtual memory address into a corresponding translated memory address, wherein computer-executable instructions cause the processor-based device to perform the speculative address translation by causing the processor-based device to perform one or more of a page table walk, an update of a translation table, and a caching of a result of the speculative address translation in a translation lookaside buffer (TLB); and
subsequent to the speculative address translation, execute the MPR instruction.

2. A method, comprising:
receiving, using an instruction decode stage of an execution pipeline circuit of a processing element (PE) of a processor-based device, a memory-pointer-referencing (MPR) instruction that references a plurality of bytes that comprises a virtual memory address, wherein:
the MPR instruction comprises an enqueue instruction directed to a peripheral device; and
the virtual memory address comprises a virtual memory address to which the peripheral device will perform a Direct Memory Access (DMA) operation;
transmitting, to a memory management unit (MMU) of the PE, a request for address translation of the virtual memory address;
performing, by the MMU, speculative address translation of the virtual memory address into a corresponding translated memory address, wherein performing the speculative address translation comprises performing one or more of a page table walk, an update of a translation table, and a caching of a result of the speculative address translation in a translation lookaside buffer (TLB); and
subsequent to the speculative address translation, executing, using an execute stage of the execution pipeline circuit, the MPR instruction.

3. The method of claim 2, wherein the method further comprises:
detecting, using the MMU, an address translation error while performing the speculative address translation; and
raising an address translation exception to a hypervisor executing on the processor-based device.

4. The method of claim 2, further comprising:
detecting, using the MMU, an address translation error while performing the speculative address translation, wherein the address translation error comprises a stage one (1) translation error that occurs during translation of a guest virtual address into a guest physical address; and
raising an address translation exception to a guest operating system (OS) executing within a virtual machine (VM) on the processor-based device.

5. The method of claim 2, further comprising:
detecting, using the MMU, an address translation error while performing the speculative address translation, wherein the address translation error comprises a stage two (2) translation error that occurs during translation of a guest physical address into a system physical address; and
raising an address translation exception to a hypervisor executing on the processor-based device.

6. A processor-based device, comprising:
a processing element (PE) comprising:
an execution pipeline circuit comprising an instruction decode stage and an execute stage; and
a memory management unit (MMU);
the PE configured to:
receive, using the instruction decode stage, a memory-pointer-referencing (MPR) instruction that references a plurality of bytes that comprises a virtual memory address, wherein:
the MPR instruction comprises an enqueue instruction directed to a peripheral device; and
the virtual memory address comprises a virtual memory address to which the peripheral device will perform a Direct Memory Access (DMA) operation;
transmit, to the MMU, a request for address translation of the virtual memory address;
perform, using the MMU, speculative address translation of the virtual memory address into a corresponding translated memory address, wherein the PE is configured to perform the speculative address translation by being configured to perform one or more of a page table walk, an update of a translation table, and a caching of a result of the speculative address translation in a translation lookaside buffer (TLB); and
subsequent to the speculative address translation, execute, using the execute stage of the execution pipeline circuit, the MPR instruction.

7. The processor-based device of claim 6, wherein:
the MPR instruction further references an address indicator that indicates a location of the virtual memory address within the plurality of bytes, wherein the address indicator comprises a plurality of bits that each corresponds to a value within the plurality of bytes and indicates whether the value within the plurality of bytes represents a corresponding virtual memory address; and
the PE is further configured to retrieve the virtual memory address from the plurality of bytes based on the address indicator.

8. The processor-based device of claim 6, wherein:
the PE further comprises a register;
the MPR instruction further references a register indicator indicating the register; and
the PE is further configured to:
prior to receiving the MPR instruction, store, in the register, an address indicator that indicates a location of the virtual memory address within the plurality of bytes; and
prior to transmitting the request for address translation of the virtual memory address:
read the address indicator from the register based on the register indicator; and
retrieve the virtual memory address from the plurality of bytes based on the address indicator.

9. The processor-based device of claim 8, wherein:
the PE is further configured to store, in the register, a page count indicator that indicates a count of memory pages requiring address translation for the virtual memory address; and
the PE is configured to perform the speculative address translation based on the page count indicator.

10. The processor-based device of claim 6, wherein:
an opcode of the MPR instruction comprises an address indicator that indicates a location of the virtual memory address within the plurality of bytes; and the PE is further configured to retrieve the virtual memory address from the plurality of bytes based on the address indicator.

11. The processor-based device of claim 6, wherein:
the MPR instruction further references a page count indicator that indicates a count of memory pages requiring address translation for the virtual memory address; and
the PE is configured to perform the speculative address translation based on the page count indicator.

12. The processor-based device of claim 6, wherein:
the plurality of bytes comprises a page count indicator that indicates a count of memory pages requiring address translation for the virtual memory address; and
the PE is configured to perform the speculative address translation based on the page count indicator.

13. The processor-based device of claim 6, wherein:
an opcode of the MPR instruction comprises a page count indicator that indicates a count of memory pages requiring address translation for the virtual memory address; and
the PE is configured to perform the speculative address translation based on the page count indicator.

14. The processor-based device of claim 6, wherein:
the MPR instruction further references a synchronicity indicator that indicates whether address translation exceptions are raised synchronously prior to transmitting the enqueue command to the peripheral device or asynchronously in parallel with transmitting the enqueue command to the peripheral device; and
the PE is further configured to:
  detect, using the MMU, an address translation error while performing the speculative address translation; and
  raise an address translation exception based on the synchronicity indicator.

15. The processor-based device of claim 6, wherein the PE is further configured to:
  detect, using the MMU, an address translation error while performing the speculative address translation; and
  raise an address translation exception.

16. The processor-based device of claim 15, wherein the PE is configured to raise the address translation exception to a hypervisor executing on the processor-based device.

17. The processor-based device of claim 15, wherein:
the address translation error comprises a stage one (1) translation error that occurs during translation of a guest virtual address into a guest physical address; and
the PE is configured to raise the address translation exception to a guest operating system (OS) executing within a virtual machine (VM) on the processor-based device.

18. The processor-based device of claim 15, wherein:
the address translation error comprises a stage two (2) translation error that occurs during translation of a guest physical address into a system physical address; and
the PE is configured to raise the address translation exception to a hypervisor executing on the processor-based device.

19. The processor-based device of claim 6, wherein:
the MMU comprises the TLB comprising a plurality of TLB entries;
the MPR instruction further references a TLB indicator that indicates whether a TLB entry of the plurality of TLB entries is allocated for the speculative address translation of the virtual memory address into the corresponding translated memory address of the system memory; and
the PE is configured to perform the speculative address translation based on the TLB indicator.

* * * * *